(12) United States Patent
Choi et al.

(10) Patent No.: US 10,181,803 B2
(45) Date of Patent: Jan. 15, 2019

(54) HOME APPLIANCE AND OPERATING METHOD THEREOF

(71) Applicant: LG ELECTRONICS INC., Seoul (KR)

(72) Inventors: Byoungsuk Choi, Seoul (KR); Jinseok Hu, Seoul (KR); Heesun Kim, Seoul (KR); Shinhyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 14/832,779

(22) Filed: Aug. 21, 2015

(65) Prior Publication Data

US 2016/0056666 A1 Feb. 25, 2016

(30) Foreign Application Priority Data

Aug. 25, 2014 (KR) .......................... 10-2014-0110621
Sep. 22, 2014 (KR) .......................... 10-2014-0125592

(51) Int. Cl.
*H02J 3/14* (2006.01)
*H02M 7/44* (2006.01)
(Continued)

(52) U.S. Cl.
CPC ................. *H02M 7/44* (2013.01); *H02J 3/14* (2013.01); *H02J 9/062* (2013.01);
(Continued)

(58) Field of Classification Search
CPC .... H02M 7/44; H02J 3/14; H02J 9/062; H02J 2003/143; Y02B 70/3225; Y02B 70/3291; Y04S 20/222; Y04S 20/248
(Continued)

(56) References Cited

U.S. PATENT DOCUMENTS 5,778,694 A 7/1998 Jeong
6,181,538 B1 1/2001 Yoo
(Continued)

FOREIGN PATENT DOCUMENTS

JP H 05-071847 3/1993
JP 2013-117976 A 6/2013
(Continued)

OTHER PUBLICATIONS

Korean Office Action dated Mar. 3, 2016 issued in Application No. 10-2014-0125592.
(Continued)

*Primary Examiner* — Brandon S Cole
(74) *Attorney, Agent, or Firm* — Ked & Associates, LLP

(57) ABSTRACT

An appliance includes a driver to drive a load, the load requiring AC power or DC power. A power supply receives one of external AC power, back-up AC power and back-up DC power and outputs at least one of AC power or DC power to the load. An operation mode of the home appliance is one of normal operation when receiving external AC power, normal operation when receiving one of back-up AC power and back-up DC power during a power interruption, and a power save mode when receiving one of back-up AC power and back-up DC power during the power interruption. The power supplies a first power level when there is no power interruption, a second power level when there is power interruption and a third power level when there is power interruption and the power save mode is selected, where the second power level is between the first power level and the third power level. The power save mode is automatically selected when the second power level falls below a reference power level.

18 Claims, 16 Drawing Sheets

(51) Int. Cl.
  *G06F 9/00* (2006.01)
  *G06F 1/32* (2006.01)
  *H04N 5/57* (2006.01)
  *G06F 3/023* (2006.01)
  *G05B 15/02* (2006.01)
  *H04W 4/00* (2018.01)
  *H04W 4/06* (2009.01)
  *H02J 9/06* (2006.01)
  *G06F 3/01* (2006.01)

(52) U.S. Cl.
  CPC ..... *H02J 2003/143* (2013.01); *Y02B 70/3225* (2013.01); *Y02B 70/3291* (2013.01); *Y04S 20/222* (2013.01); *Y04S 20/248* (2013.01)

(58) Field of Classification Search
  USPC .................................................. 307/43–87
  See application file for complete search history.

(56) References Cited

U.S. PATENT DOCUMENTS

| | | | |
|---|---|---|---|
| 2006/0260335 A1 | 11/2006 | Montuoro et al. | |
| 2007/0058047 A1* | 3/2007 | Henty | G06F 3/0304 348/211.99 |
| 2009/0293523 A1 | 12/2009 | Bittner et al. | |
| 2011/0067423 A1 | 3/2011 | Kawamukai et al. | |
| 2011/0298302 A1* | 12/2011 | Pitigoi-Aron | H01H 9/00 307/125 |
| 2011/0302939 A1 | 12/2011 | Rockenfeller et al. | |
| 2012/0112547 A1* | 5/2012 | Ghosh | H02J 9/062 307/66 |
| 2012/0286723 A1* | 11/2012 | Ukita | G06Q 10/06312 320/107 |
| 2012/0324260 A1* | 12/2012 | Kezuka | H04N 5/57 713/320 |
| 2013/0229172 A1 | 9/2013 | Heo et al. | |
| 2013/0313902 A1* | 11/2013 | Sako | H02J 9/005 307/23 |
| 2014/0013779 A1 | 1/2014 | Cho et al. | |
| 2014/0218180 A1* | 8/2014 | Shih | G08C 17/00 340/12.5 |
| 2014/0316799 A1* | 10/2014 | Cosgrove | G06F 19/3462 705/2 |
| 2015/0036573 A1* | 2/2015 | Malik | H04W 52/0254 370/311 |
| 2015/0214758 A1* | 7/2015 | Toya | H01M 2/1016 320/112 |
| 2015/0276821 A1 | 10/2015 | Hu et al. | |
| 2016/0014446 A1* | 1/2016 | Li | H04N 21/42209 725/40 |

FOREIGN PATENT DOCUMENTS

| | | |
|---|---|---|
| JP | 2013-247751 | 12/2013 |
| KR | 10-2000-0042551 | 7/2000 |
| KR | 10-2009-0012521 | 2/2009 |
| KR | 10-2009-0111708 A | 10/2009 |
| KR | 10-2010-0023604 A | 3/2010 |
| KR | 10-2012-0120095 | 11/2012 |
| KR | 10-2012-0129366 | 11/2012 |

OTHER PUBLICATIONS

Korean Office Action dated Oct. 24, 2016 issued in Application No. 10-2014-0109100.
Korean Office Action dated Mar. 6, 2017 issued in Application No. 10-2014-0109100.
Korean Office Action dated Aug. 18, 2016 issued in Application No. 10-2014-0110621.
U.S. Office Action dated Sep. 8, 2017 issued in co-pending U.S. Appl. No. 14/832,615.
United States Notice of Allowance dated Sep. 13, 2017 issued in U.S. Appl. No. 14/831,658.
Korean Notice of Allowance dated Jun. 8, 2016 issued in Application No. 10-2014-0125592.

* cited by examiner

100b

100c

100d

100e

HOME APPLIANCE AND OPERATING METHOD THEREOF

CROSS-REFERENCE TO RELATED APPLICATION

This application claims priority under 35 U.S.C. § 119 to Korean Patent Application Nos. 10-2014-0110621 filed Aug. 25, 2014 and 10-2014-0125592 filed on Sep. 22, 2014 in the Korean Intellectual Property Office, whose entire disclosures are hereby incorporated by reference.

BACKGROUND

1. Field

The present disclosure relates to a home appliance and an operating method thereof, and more particularly, to a home appliance and an operating method thereof, which are capable of simply informing of an operation mode upon interruption of electric power.

2. Background

Among home appliances installed in a building, for convenience of users, refrigerators function to store food, laundry treating appliances function to treat laundry, air conditioners function to adjust room temperature, and cooking appliances function to cook food. Meanwhile, among such home appliances, refrigerators must continuously operate through continuous supply of electric power thereto. To this end, a variety of research is being conducted to stably operate such a refrigerator even when supply of electric power is unstable, in particular, during interruption of electric power.

BRIEF DESCRIPTION OF THE DRAWINGS

The embodiments will be described in detail with reference to the following drawings in which like reference numerals refer to like elements wherein.

DETAILED DESCRIPTION

Figure 1:
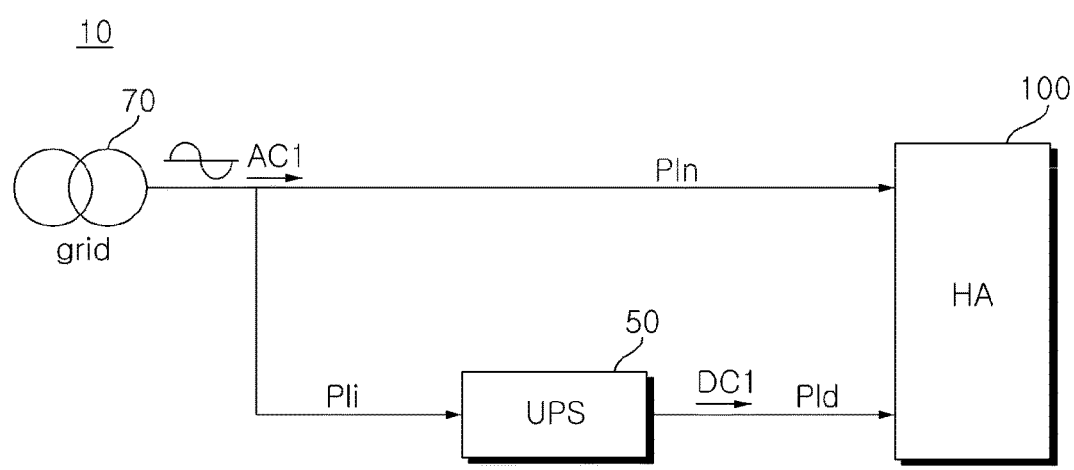
FIG. 1 is a view illustrating an example of supply of electric power to a home appliance according to an embodiment of the present disclosure.

FIG. 1 illustrates an example of supply of electric power to a home appliance according to an embodiment of the present disclosure. The refrigerator power supply system 10 may include a home appliance 100, a grid 70, and an uninterruptible power supply (UPS) 50. The grid 70 supplies commercial AC power AC1 to the home appliance 100 via a first power line Pln.

The UPS 50 may be connected to the first power line Pln in parallel in order to cope with a situation in which commercial AC power supplied from the grid 70 has an unstable level or supply of the commercial AC power is interrupted. In FIG. 1, parallel connection of a second power line Pli to the first power line Pln is illustrated.

The UPS 50 may determine interruption of electric power when AC power applied via the second power line Pli has a level equal to or lower than a predetermined level. In this case, the UPS 50 may supply DC power DC1 stored in an internal battery to the home appliance 100 via a third power line Pld.

In a normal state other than interruption of electric power, the home appliance 100 may receive the commercial AC power AC1 from the grid 70 via the first power line Pln. On the other hand, during interruption of electric power, the home appliance 100 may receive the DC power DC1 from the UPS 50 via the third power line Pld.

Figure 2:
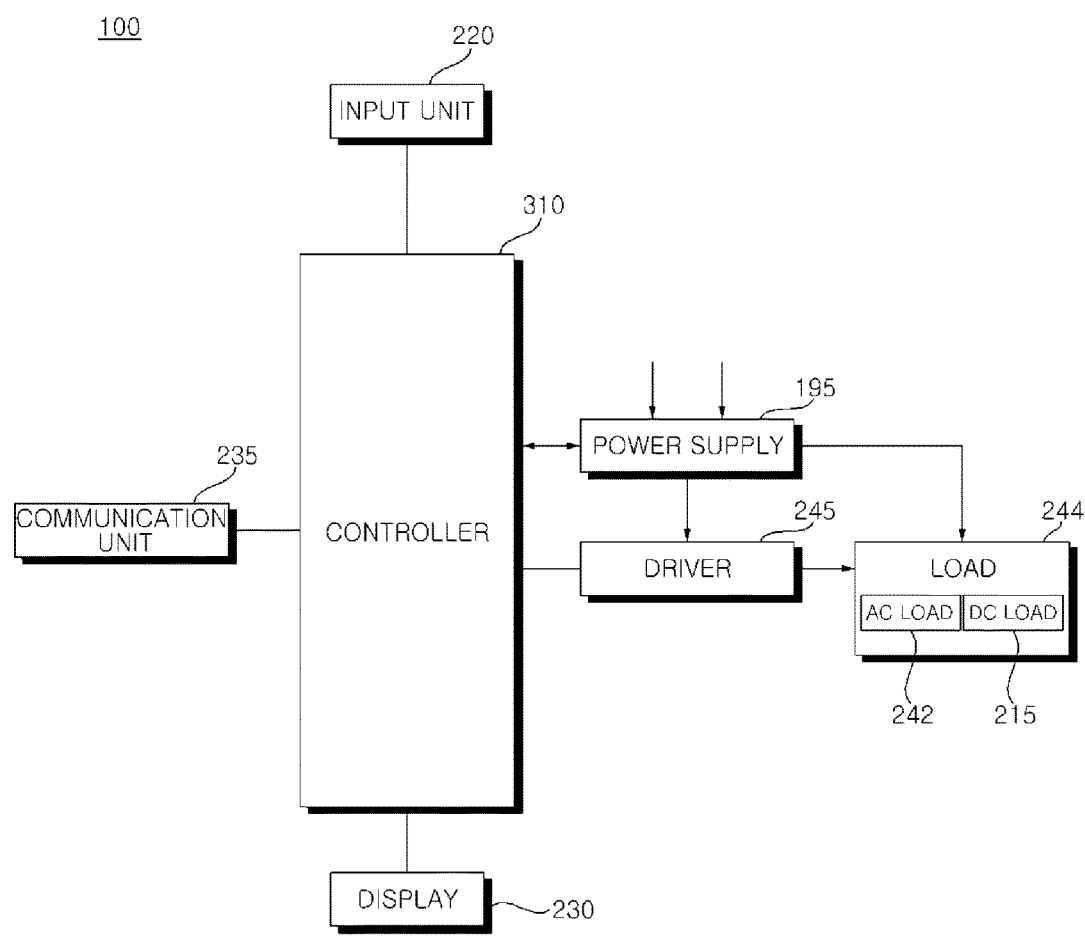
FIG. 2 is a block diagram roughly illustrating an inner configuration of the home appliance illustrated in FIG. 1.

As shown in FIG. 2, the home appliance 100 may include a driver 245 for driving a load 244, and a power supply 195 for converting the AC power AC1, which is supplied from the outside of the home appliance 100, while receiving the DC voltage DC1 during interruption of electric power. The home appliance 100 further includes a controller 310 for performing a control operation to supply a first electric power Le1 to the load 244 based on the AC power AC1 supplied to the power supply 195 in accordance with a normal operation mode when no interruption of electric power occurs, and a control operation to supply a third electric power Le3 to the load 244 based on the DC power DC1 applied to the power supply 195 in accordance with a power saving mode during interruption of electric power.

In particular, during interruption of electric power, the home appliance 100 supplies second electric power Le2 based on the applied DC power DC1 to the load 244 for a first period in accordance with the normal operation mode, and supplies the third electric power Le3 based on the applied DC power DC1 for a second period in accordance with the power saving mode. Accordingly, it may be possible to stably supply electric power to the home appliance 100 even when interruption of electric power is lengthened. Such an operation method of the home appliance will be described later in more detail with reference to FIG. 6.

Figure 3A:
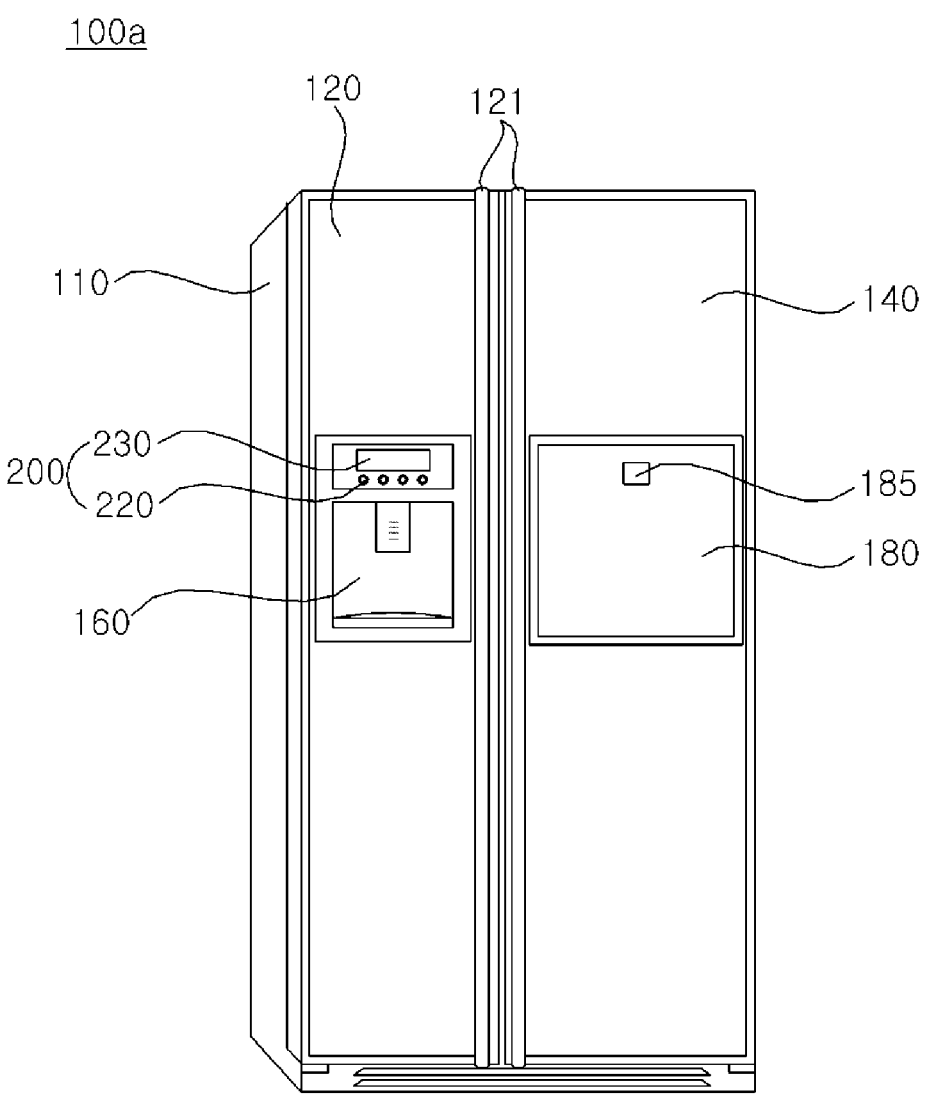
FIGS. 3A to 3F are views explaining various examples of the home appliance.
Figure 3B:
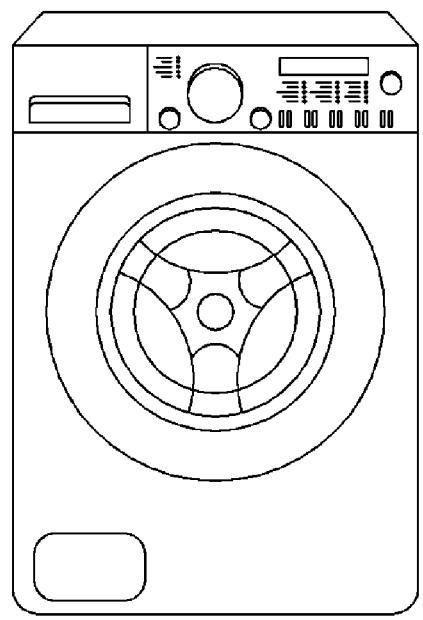
Figure 3C:
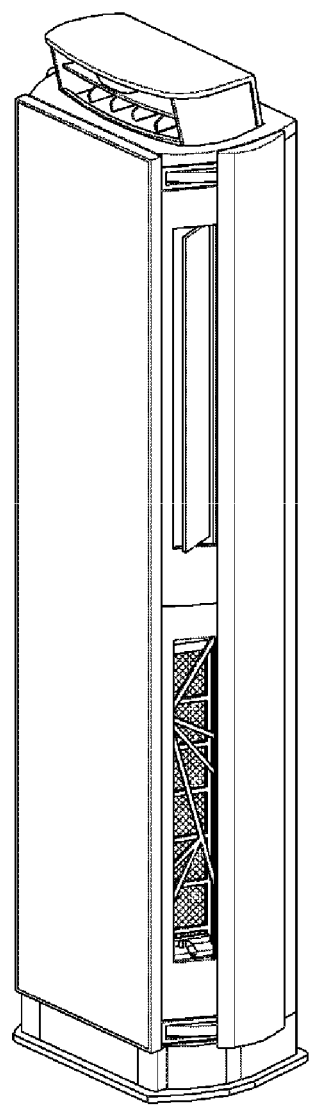
Figure 3D:
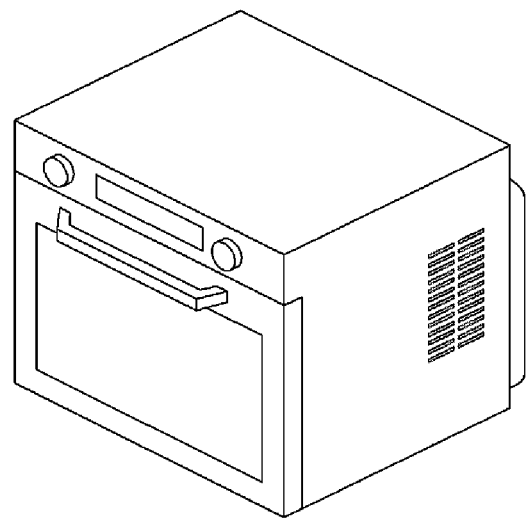
Figure 3E:
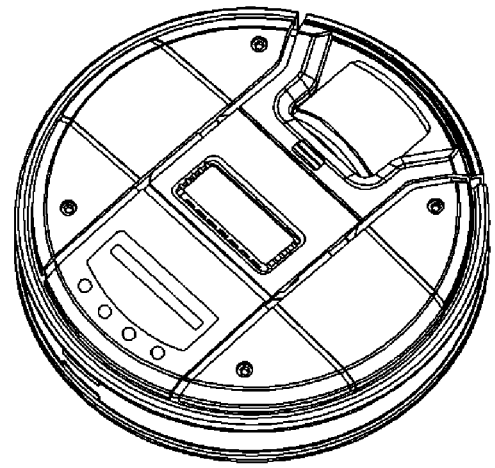
Figure 3F:
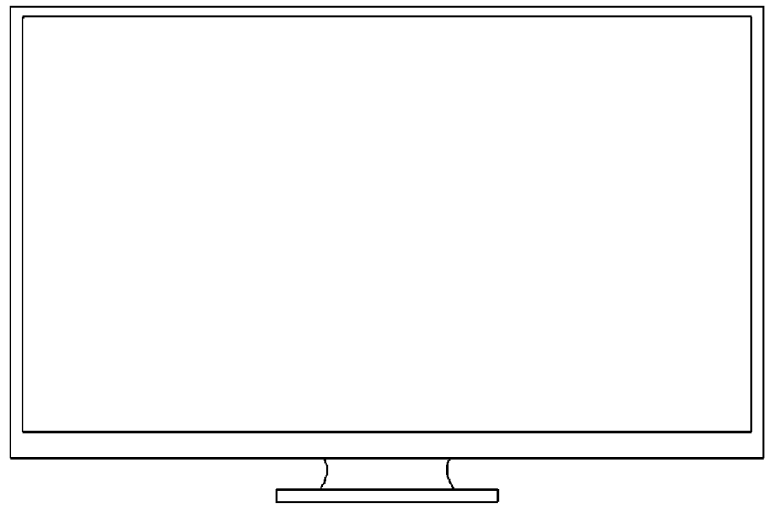

FIGS. 3A to 3F are views explaining various examples of the home appliance. FIG. 3A illustrates a refrigerator 100a. FIG. 3 illustrates a washing machine 100b. FIG. 3C illustrates an air conditioner 100c. FIG. 3D illustrates a cooking appliance 100d. FIG. 3E illustrates a cleaner 100e. FIG. 3F illustrates a TV 100f. Meanwhile, there may also be various other examples of the home appliance.

First, the refrigerator 100a of FIG. 3A will be described in detail. Although not shown, the appearance of the refrigerator 100a is approximately defined by a case 110 having an inner space partitioned into a freezing compartment and a refrigerating compartment, a freezing compartment door 120 for closing the freezing compartment, and a refrigerating compartment door 140 for closing the refrigerating compartment.

Door handles 121 are provided at respective front surfaces of the freezing compartment door 120 and refrigerating compartment door 140. The door handles 121 protrude forwardly in order to allow the user to easily pivot the freezing compartment door 120 and refrigerating compartment door 140 while grasping the door handles 121.

A home bar 810 may be further provided at the front surface of the refrigerating compartment door 140, as a convenience means for allowing the user to retrieve articles, such as beverages, stored inside of the refrigerating compartment door 140 without opening the refrigerating compartment door 140.

A dispenser 160 may also be provided at the front surface of the freezing compartment door 120, as a convenience means for allowing the user to retrieve ice or drinking water without opening the freezing compartment door 120. A control panel 200 may further be provided at the front surface of the freezing compartment door 120 above the dispenser 160. The control panel 200 allows the user to control operation of the refrigerator 100a, and displays a state of the refrigerator 100a on a screen.

The control panel 200 may include an input unit 220 including a plurality of buttons, and a display 230 for displaying a control screen, an operation state, etc. The display 230 displays information such as a control screen, operation state, and compartment temperature. For example, the display 230 may display a service type of the dispenser 160 (ice cubes, water, or crushed ice), a set freezing compartment temperature, and a set refrigerating compartment temperature.

The display 230 may be implemented using various displays such as a liquid crystal display (LCD), a light emitting diode (LED), and an organic light emitting diode (OLED). Alternatively, the display 230 may be implemented using a touchscreen capable of additionally performing the function of the input unit 220.

The input unit 220 may include a plurality of operating buttons. For example, the input unit 220 may include a dispenser setting button (not shown) for setting a service type of the dispenser (ice cubes, water, or crushed ice), a freezing compartment temperature setting button (not shown) for setting a freezing compartment temperature, and a refrigerating compartment temperature setting button (not shown) for setting a refrigerating compartment temperature. Meanwhile, the input unit 220 may be implemented using a touchscreen capable of additionally performing the function of the display 230.

Meanwhile, the refrigerator associated with the present disclosure is not limited to the double door type illustrated in the drawings, and may be of any type, for example, one door type, sliding door type, or curtain door type, so long as a compressor and a fan are provided for the refrigerating cycle or freezing cycle of the refrigerator.

Figure 4:
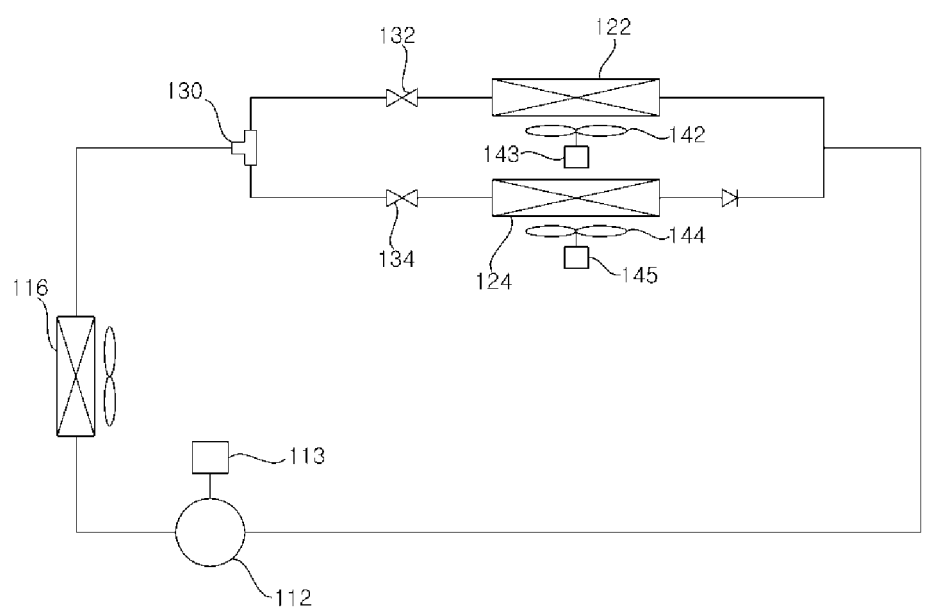
FIG. 4 is a view roughly illustrating a configuration of a refrigerator illustrated in FIG. 3A.

FIG. 4 is a view roughly illustrating a configuration of the refrigerator illustrated in FIG. 3A.

Referring to FIG. 4, the refrigerator 100a includes a compressor 112, a condenser 116 for condensing a refrigerant compressed in the compressor 112, a refrigerating compartment evaporator 122, and a freezing compartment evaporator 124. The refrigerating compartment evaporator 122 and freezing compartment evaporator 124 are disposed in the refrigerating compartment and the freezing compartment, respectively, to evaporate the refrigerant condensed in the condenser 116 after receiving the condensed refrigerant. The refrigerator 100a further includes a 3-way valve 130 for supplying the condensed refrigerant from the condenser 116 to the refrigerating compartment evaporator 122 or the freezing compartment evaporator 124, a refrigerating compartment expansion valve 132 for expanding the refrigerant supplied to the refrigerating compartment evaporator 122, and a freezing compartment expansion valve 134 for expanding the refrigerant supplied to the freezing compartment evaporator 124.

The refrigerator 100a may further include a gas-liquid separator for separating the refrigerant emerging from the evaporators 122 and 124 into a gaseous refrigerant and a liquid refrigerant. The refrigerator 100a may additionally include a refrigerating compartment fan 142 for sucking cold air emerging from the refrigerating compartment evaporator 122, and blowing the sucked cold air into the refrigerating compartment, and a freezing compartment fan 144 for sucking cold air emerging from the freezing compartment evaporator 124, and blowing the sucked cold air into the freezing compartment.

The refrigerator 100a may further include a compressor driver 113 for driving the compressor 112, a refrigerating compartment fan driver 143 for driving the refrigerating compartment fan 142, and a freezing compartment fan driver 145 for driving the freezing compartment fan 144.

As previously indicated, FIG. 2 is a block diagram roughly illustrating an inner configuration of the home appliance illustrated in FIG. 1. The home appliance 100 includes a power supply 195, an input unit 220, a display 230, a load 144, a driver 234, and a controller 310. The home appliance 100 may further include a communication unit 235, and an audio output unit. The input unit 220 includes a plurality of operating buttons and, as such, sends an input signal, for example, a freezing compartment setting temperature or a refrigerating compartment setting temperature, to the controller 310.

The display 230 may display an operation state of the home appliance 100 or the like. To this end, the display 230 may include an LED, an LCD, or an OLED. The display 230 may display an operation mode upon interruption of electric power. For example, when the operation mode upon interruption of electric power is a normal operation mode based on DC power, the display 230 may display information indicating this operation mode. On the other hand, when the operation mode upon interruption of electric power is a power saving operation mode based on DC power, the display 230 may display information indicating this operation mode.

When there is no power saving mode input upon interruption of electric power, the display 230 may display a power saving mode recommendation message. Alternatively, the display 230 may output the power saving mode recommendation message through the audio output unit.

The communication unit 235 may exchange data with an external device through wired or wireless communication. For example, the communication unit 235 may receive information about interruption of electric power, kind and level of backup power supplied upon interruption of electric power, supply duration of the backup power, etc. from an access point (AP) device, the UPS 50, or a mobile terminal by a power line communication (PLC) system, a wireless fidelity (Wi-Fi) system, a ZigBee system, or the like.

The load 244 may be divided into an AC load 242 and a DC load 215. When the home appliance 100 is the refrigerator 100a, the AC load 242 may include the compressor 112, AC load 242, and freezing compartment fan 144. In this case, the DC load 215 may include a damper 115. On the other hand, when the home appliance 100 is the washing machine 100b of FIG. 2B, the AC load 242 may include a washing tube, and the DC load 215 may include a display, etc.

When the home appliance 100 is the air conditioner 100c of FIG. 2C, the AC load 242 may include a compressor, an indoor fan, an outdoor fan, etc., and the DC load 215 may include a display, etc. On the other hand, when the home appliance 100 is a cooking appliance 100d of FIG. 2D, the AC load 242 may include a magnetron, a microwave generator, or the like, and the DC load 215 may include a display, etc.

When the home appliance 100 is the cleaner 100e of FIG. 2E, the AC load 242 may include a travel unit, a cleaning unit placed in the travel unit, or the like, and the DC load 215 may include a display, a communication unit, etc. Meanwhile, when the home appliance 100 is the TV 100f of FIG. 2F, the AC load 242 may include a relay or the like, and the DC load 215 may include may include a display, a communication unit, etc.

The driver 245 drives the load 244 of the home appliance 100. As described above, the driver 245 drives each load of FIGS. 3A to 3F. The power supply 195 may receive the commercial AC power AC1 from the outside in a normal state. On the other hand, during interruption of electric power, the power supply 195 may receive the DC power DC1 from the UPS 50.

Figure 5:
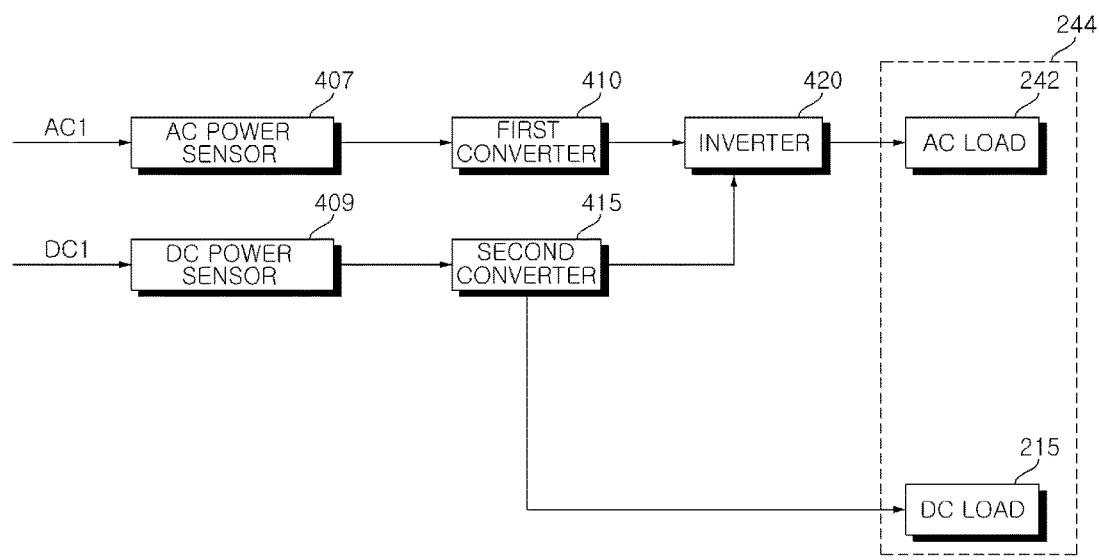
FIG. 5 is a block diagram illustrating an example of an inner configuration of a power supply illustrated in FIG. 2.

Referring to FIG. 5, the power supply 195 may include an AC power sensor 407 for sensing the commercial AC power AC1 supplied from the outside in a normal state, the first converter 410 for converting the commercial AC power AC1 supplied from the outside into DC power, and the inverter 420 for converting the converted DC power into AC power. When the home appliance is the refrigerator 100a, the AC power converted by the inverter 420 may be applied to the refrigerating compartment fan 142, freezing compartment fan 144, and compressor 112, to be used for driving thereof.

The power supply 195 may further include a DC power sensor 409 for sensing the DC power DC1 supplied from the external UPS 50 upon interruption of electric power, and the second converter 415 for converting level of the DC power DC1 supplied from the external UPS 50 upon interruption of electric power. The DC power level-converted by the second converter 415 may be applied to the damper 115. The DC power level-converted by the second converter 415 may also be applied to the inverter 420, to be used for driving of the AC load 242 of the load 244. In addition, the power supply 195 may supply the converted DC power or converted AC power to the AC load 242 and DC load 215 of the load 244, etc.

The AC power sensor 407 may detect the commercial AC power AC1 input from the grid 70. To this end, the AC power sensor 407 may include a current transformer (CT) to detect an input AC current, a shunt resistor, a voltage transformer (VT) to detect an input AC voltage, etc. The detected input AC current or input AC voltage may be input to the controller 310, as a discrete pulse signal. The controller 310 may determine whether or not interruption of the commercial AC power AC1 has occurred, based on the detected input AC current or input AC voltage.

The DC power sensor 409 may detect the DC power DC1 input from the UPS 50. To this end, the DC power sensor 409 may include a current transformer (CT) to detect an input DC current, a shunt resistor, a voltage transformer (VT) to detect an input DC voltage, etc. The detected input DC current or input DC voltage may be input to the controller 310, as a discrete pulse signal.

The controller 310 may determine whether or not interruption of the commercial AC power AC1 has occurred, based on the detected input DC current or input DC voltage. The first converter 410 converts the commercial AC power AC1 into DC power, and then outputs the converted DC power.

For example, the first converter 410 may be constituted by a diode, etc. without using a switching element and, as such, may perform a rectification operation without requiring a separate switching operation. Alternatively, the first converter 410 may include a switching element. In this case, the first converter 410 may perform boosting operation, improvement of power factor, and DC power conversion through switching operation of the switching element.

The second converter 415 may convert level of the DC power DC1, and may output the level-converted DC power DC1. The second converter 415 may be a DC/DC converter. For example, the second converter 415 may be a buck converter, a boost converter, a buck-boost converter, or a fly-back converter. The inverter 420 includes a plurality of inverter switching elements. In accordance with ON/OFF operations of the inverter switching elements, the inverter 420 may convert DC power received from the first converter 410 or second converter 415 into 3-phase AC power va-vb-vc having a predetermined frequency, and may output the 3-phase AC power va-vb-vc.

The inverter 420 may have a configuration in which three pairs of arm switching elements are connected in parallel, and each arm switching element pair includes upper and lower arm switching elements connected in series. In accordance with operations of the switching elements in the inverter 420, the converted AC power may be supplied to the AC load 242 of the load 244, etc.

The controller 310 may control various operations of inner constituent elements of the home appliance. For example, the controller 310 may control operation of the driver 254, etc. Meanwhile, in accordance with an embodiment of the present disclosure, the controller 310 may perform a control operation to supply first electric power Le1 based on the applied AC power AC1 to the load 244 in accordance with a normal operation mode in a state in which no interruption of electric power occurs, may perform a control operation to supply second electric power Le2 based on the applied DC power DC1 to the load 244 in accordance with the normal operation mode during interruption of electric power, and may perform a control operation to supply third electric power Le3 based on the applied DC power DC1 to the load 244 in accordance with a power saving mode during interruption of electric power. The controller 310 may perform a control operation to output a power saving mode recommendation message when there is no power saving mode input upon interruption of electric power.

During interruption of electric power, the controller 310 may perform a control operation to supply the second electric power Le2 based on the applied DC power DC1 to the load 244 for a first period in accordance with the normal operation mode, and may perform a control operation to supply the third electric power Le3 based on the applied DC power DC1 to the load 244 for a second period in accordance with the power saving mode in response to a power saving mode input. In this case, the first electric power Le1 may have a higher level than the second electric power Le2, and the third electric power Le3 may have a lower level than the second electric power Le2.

The controller 310 may determine whether or not interruption of electric power has occurred, based on level of the AC power AC1 sensed by an AC power sensor to sense level of the AC power AC1 or based on level of the DC power DC1 sensed by a DC power sensor to sense level of the DC power DC1. The controller 310 may vary at least one of the second electric power Le2 and third electric power Le3 in accordance with the sensed level of the DC power DC1. The controller 310 may restrict operation of the driver 245 or vary operation modes in accordance with the sensed level of the DC power DC1.

The controller 310 may also perform a control operation to activate only a part of the various buttons of the input unit 220, namely, buttons associated with the power saving mode and a power button, upon interruption of electric power. For example, a power saving mode button may be activated upon interruption of electric power to induce operation thereof. When the power saving mode operates during interruption of electric power, only a power saving mode release button may be activated, and other buttons may be deactivated.

The controller 310 may also perform a control operation to vary operation mode or operation time of the home appliance 100 upon interruption of electric power based on information about interruption of electric power, kind and level of backup power supplied upon interruption of electric power, supply duration of the backup power, etc. The controller 310 may perform a control operation to achieve a customized operation.

The audio output unit may convert an electrical signal from the controller 170 into an audio signal, and then output the audio signal. To this end, the audio output unit may include a speaker or the like. The audio output unit may output a power saving mode recommendation message for execution of the power saving mode upon interruption of electric power.

Figure 6:
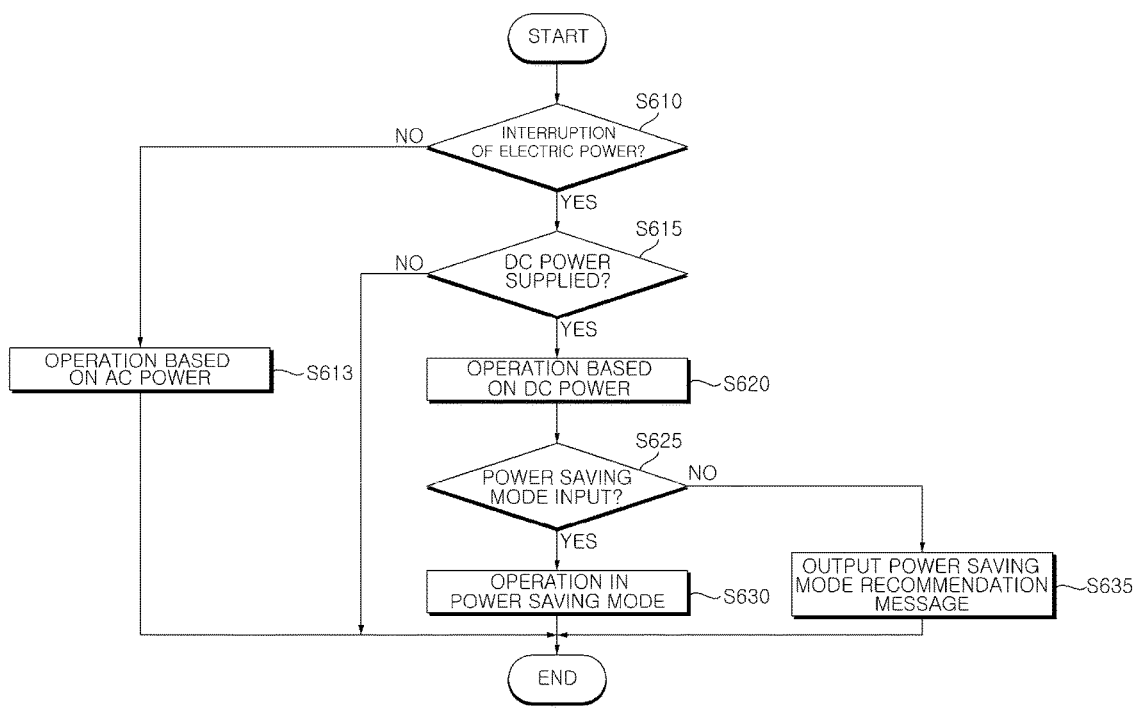
FIG. 6 is a flowchart illustrating an operating method of the home appliance according to an embodiment of the present disclosure.
Figure 7:
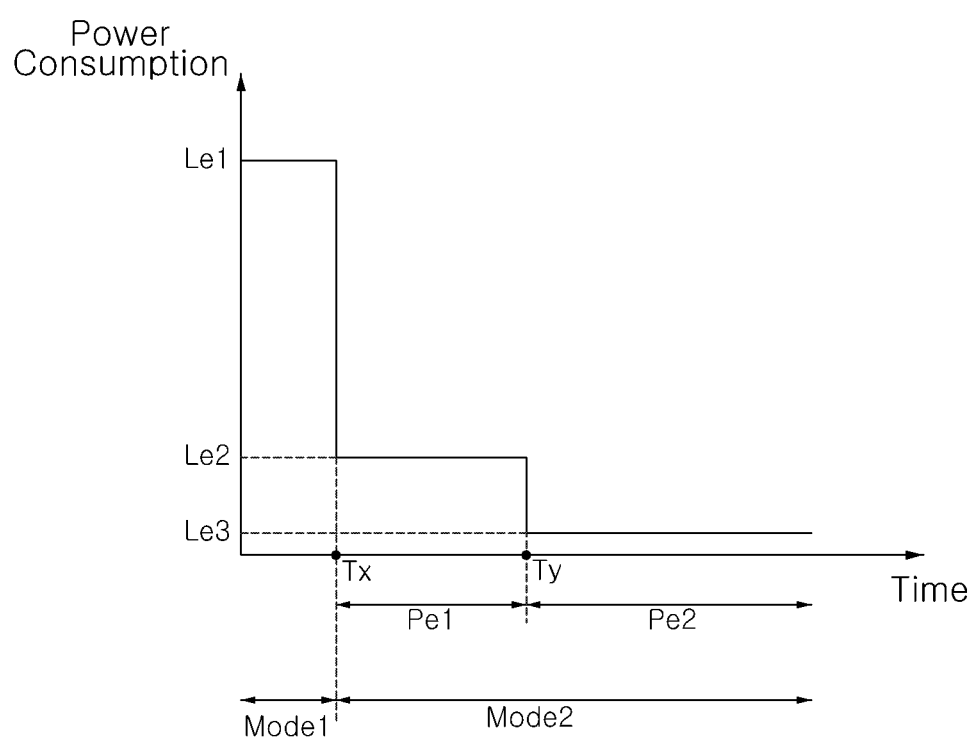
FIGS. 7 and 8 are views explaining the operating method of FIG. 6.
Figure 8:
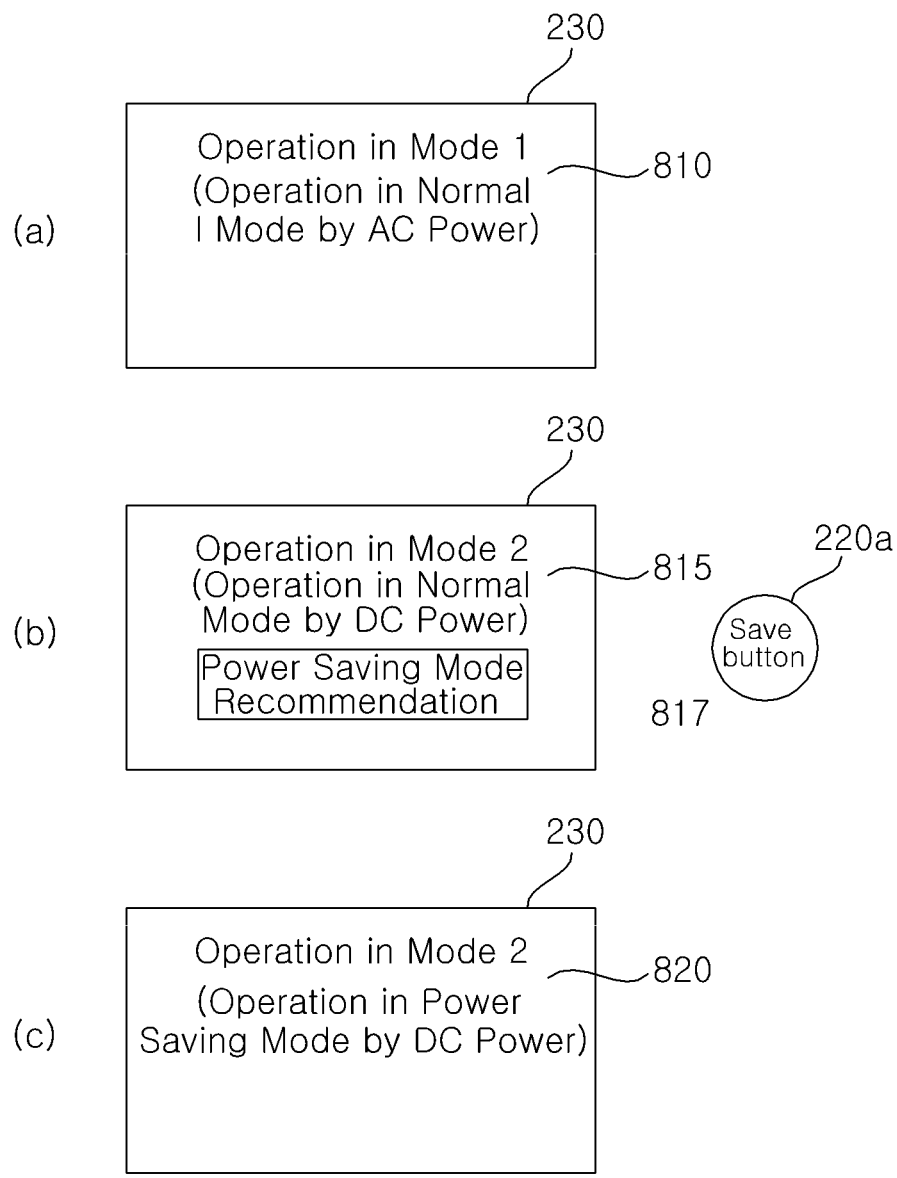

FIG. 6 is a flowchart illustrating an operating method of the home appliance according to an embodiment of the present disclosure. FIGS. 7 and 8 are views explaining the operating method of FIG. 6.

Referring to FIG. 6, the controller 310 first determines whether or not interruption of electric power has occurred (S610). For example, the controller 310 may determine whether or not interruption of electric power has occurred, based on level of the AC power AC1 sensed by the AC power sensor 407 or level of the DC power DC1 sensed by the DC power sensor 409.

When the level of the AC power AC1 sensed by the AC power sensor 407 is equal to or lower than a predetermined first level, the controller 310 may determine that interruption of electric power has occurred. Alternatively, when the level of the DC power DC1 sensed by the DC power sensor 409 is equal to or lower than a predetermined second level, the controller 310 may determine that interruption of electric power has occurred.

When it is not determined that interruption of electric power has occurred, the controller 310 controls the home appliance 100 to operate normally (S613). The controller 310 of the home appliance 100 controls the home appliance 100 to operate normally based on the commercial AC power AC1 supplied to the home appliance 100. In detail, the controller 310 executes a control operation to supply first electric power Le1 to the load 244 based on the applied AC power AC1.

On the other hand, when it is determined that interruption of electric power has occurred, step S615 is executed. The controller 310 of the home appliance 100 determines whether or not the DC power DC1 is supplied (S615). For example, the controller 310 may not only determine that interruption of electric power has occurred, but may also determine that the DC power DC1 is supplied, when the level of the DC power DC1 sensed by the DC power sensor 409 is equal to or higher than the predetermined second level.

When the DC power DC1 is supplied, the controller 310 of the home appliance 100 controls the home appliance 100 to operate based on the supplied DC power DC1 (S620). The controller 310 of the home appliance 100 may perform a control operation to supply the second electric power Le2 based on the DC power DC1 to the load 244 in accordance with the normal operation mode. In this case, the second electric power Le2 in the normal operation mode may be lower than the first electric power Le1 before interruption of electric power.

The controller 310 of the home appliance 100 may also determine whether or not a power saving mode input has been received (S625). When it is determined that a power saving mode input has been received, the controller 310 controls the home appliance 100 to operate in the power saving mode (S630). On the other hand, when it is not determined that a power saving mode input has been received, the controller 310 may perform a control operation to output a power saving mode recommendation message while controlling the home appliance 100 to operate normally (S635).

For example, when a power saving mode button 220a (FIG. 8) in the input unit 220 operates upon interruption of electric power, the controller 310 of the home appliance 100 controls the home appliance 100 to operate in the power saving mode. The controller 310 of the home appliance 100 performs a control operation to supply the third electric power Le3 to the load 244 based on the applied DC power DC1 in accordance with the power saving mode during interruption of electric power. In this case, the third electric power Le3 in the power saving mode operation may be lower than the second electric power Le2 according to the normal operation during interruption of electric power.

Hereinafter, examples of the power saving mode in various home appliances will be described. For example, when the home appliance 100 is the refrigerator 100a, in the power saving mode, driving time of the compressor 112 may be reduced, or cooling capacity may be supplied using a cold storage medium disposed in the refrigerator 100a. When the home appliance 100 is the washing machine 100b, in the power saving mode, operation time or frequency of one of washing, rinsing, and spin-drying may be reduced, drying time may be reduced, abrupt speed change of the motor in a forward or backward rotation direction may be restricted, or a heater function may be restricted.

When the home appliance 100 is the air conditioner 100c target cooling temperature may be raised, driving time of the compressor 112 may be reduced, and/or operations associated with buttons other than the button associated with the power saving mode may be restricted in the power saving mode. When the home appliance 100 is the cooking appliance 100d output power of a microwave may be reduced and/or operation time may be reduced in the power saving mode.

When the home appliance 100 is the cleaner 100e travel distance may be reduced, driving time and/or rotation speed of the fan motor in the cleaning unit may be reduced in the power saving mode. When the home appliance 100 is the TV 100f, luminance of the display to display an image may be lowered, or audio volume of the audio output unit may be lowered.

When the home appliance 100 is a dehumidifier performance of other functions than a dehumidifying function, for example, an air cleaning function, may be restricted in the power saving mode. When the home appliance 100 is a dryer a message informing of requirement to clean a duct and a filter may be output because power consumption of the duct and filter is excessive in the power saving mode.

In accordance with the power saving mode upon interruption of electric power, it may be possible to reduce power consumption of the home appliance 100, and hence, consumption of DC power supplied from the UPS 50 may be reduced. Accordingly, it may be possible to use DC power for a longer period of time. When the UPS 50 is provided with a battery, the home appliance 100 may be stably driven for a lengthened period of time.

The controller 310 may vary at least one of the second electric power Le2 and third electric power Le3 in accordance with the level of the DC power DC1 sensed upon interruption of electric power. In response to the power saving mode input, the controller 310 may perform a control operation to lower the third electric power Le3 as the sensed level of the DC power DC1 is lowered.

The controller 310 may also restrict operation of the driver 245 or vary the operation mode in response to the power saving mode input. The controller 310 may restrict operation of the driver 245 or vary the operation mode in accordance with the level of the DC power DC1 sensed upon interruption of electric power.

When it is determined at step S625 that there is no power saving mode input for a predetermined time, the controller 310 may perform a control operation to output a power saving mode recommendation message while controlling the home appliance 100 to operate normally. The power saving mode recommendation message may be output through the display 230 or the audio output unit.

FIG. 7 illustrates an example of the operating method of the home appliance before and after interruption of electric power. The time Tx indicates a time when interruption of electric power occurs. The period before the time Tx is a period in which a first mode, e.g., a normal operation mode, is executed. On the other hand, the period after the time Tx is a period in which a second mode, e.g., an operation mode upon interruption of electric power, is executed. The operation mode upon interruption of electric power, e.g., a power-interruption-based operation mode, may be divided into a normal operation mode based on DC power and a power saving operation mode.

When the home appliance 100 operates in the first mode, the first electric power Le1 based on the commercial AC power AC1 may be supplied to the load 244. When interruption of electric power occurs at the time Tx, supply of the commercial AC power AC1 to the home appliance 100 may be interrupted at the time Tx, and the DC power DC1 from the UPS 50 may be supplied to the home appliance 100.

In this case, the home appliance 100 may operate in the second mode from the time Tx. When the home appliance 100 operates in the second mode, the second electric power Le2 based on the applied DC power DC1 may be supplied to the load 244 for a first period Pe1. The second electric power Le2 may be lower than the first electric power Le1.

The controller 310 may perform a control operation to output a power saving mode recommendation message for the first period Pe1. When the power saving mode button 220*a* (FIG. 8) is pressed at a time Ty, the power saving mode may be executed. The third electric power Le3 based on the DC power DC1 may be supplied to the load 244 for a second period Pe2. In this case, the third electric power Le3 may be lower than the second electric power Le2. As consumption of electric power applied to the load is reduced in accordance with the power saving mode executed upon interruption of electric power, it may be possible to stably operate the home appliance for a lengthened period of time during interruption of electric power.

The display 230 may display the operation mode upon interruption of electric power or may display power consumption during interruption of electric power. The display 230 may also individually display the first period and the second period. FIG. 8 illustrates display of operation mode information of the home appliance on the display 230.

FIG. 8(*a*) illustrates that the display 230 displays information 810 indicating a state in which the home appliance 100 operates normally by the commercial AC power AC1 in a normal mode, namely, the first mode, under the condition that no interruption of electric power occurs.

FIG. 8(*b*) illustrates that the display 230 displays information 815 indicating a state in which the home appliance 100 operates normally based on the DC power DC1 in the second mode during interruption of electric power. A power saving mode recommendation message 817 may also be displayed on the display 230. When the user presses the power saving mode button 220*a* after seeing the message 817, the home appliance 100 may enter the power saving mode.

FIG. 8(*c*) illustrates that the display 230 displays information 820 indicating a state in which the home appliance 100 operates in the power saving mode based on the DC power DC1 during interruption of electric power. Accordingly, the user may immediately recognize the power saving mode operation upon interruption of electric power.

Figure 9:
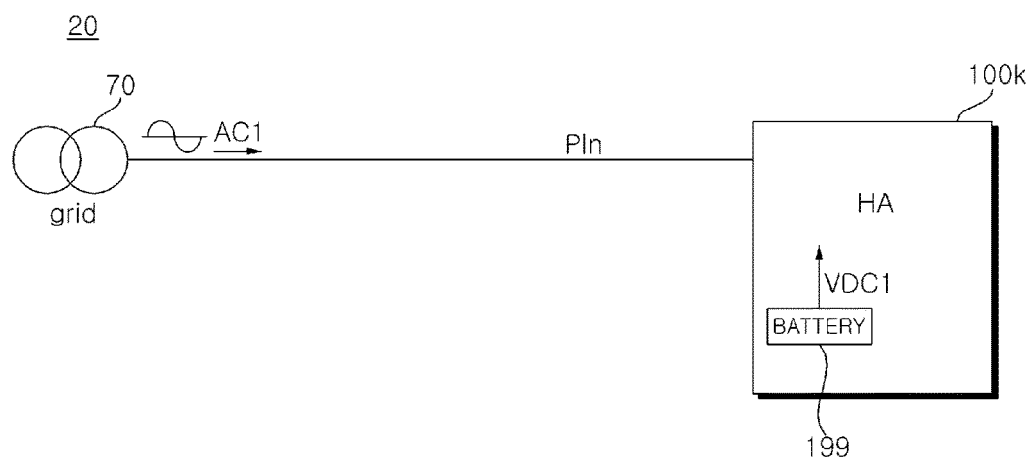
FIG. 9 is a view illustrating supply of electric power to a home appliance according to another embodiment of the present disclosure.

FIG. 9 illustrates supply of electric power to a home appliance according to another embodiment of the present disclosure. A power supply system 20 is illustrated. The power supply system 20 may include a home appliance 100*k* and a grid 70. The case of FIG. 9 differs from the case of FIG. 1 in that the UPS 50 is omitted, and the home appliance 100*k* further includes a battery 199. The following description will be given mainly in conjunction with the differences.

When no interruption of electric power occurs, the commercial AC power AC1 from the grid 70 is supplied to the home appliance 100*k* via a first line Pln. Using the commercial AC power AC1, the home appliance 100*k* supplies the first electric power Le1 to the load 244 therein. The home appliance 100*k* may store the DC power DC1 in the battery 199, using the commercial AC power AC1.

The home appliance 100*k* may sense whether interruption of electric power has occurred, based on the AC power AC1 sensed by the AC power sensor 407, and may supply electric power based on the DC power DC1 stored in the battery 199 to the load 244 during interruption of electric power. In particular, when a power saving mode input is received, the third electric power Le3 may be supplied to the load 244. The second electric power Le2 may be supplied to the load 244 when no power saving mode input is received. The home appliance 100*k* of FIG. 9 may omit the DC power sensor 409 of FIG. 5.

Figure 10:
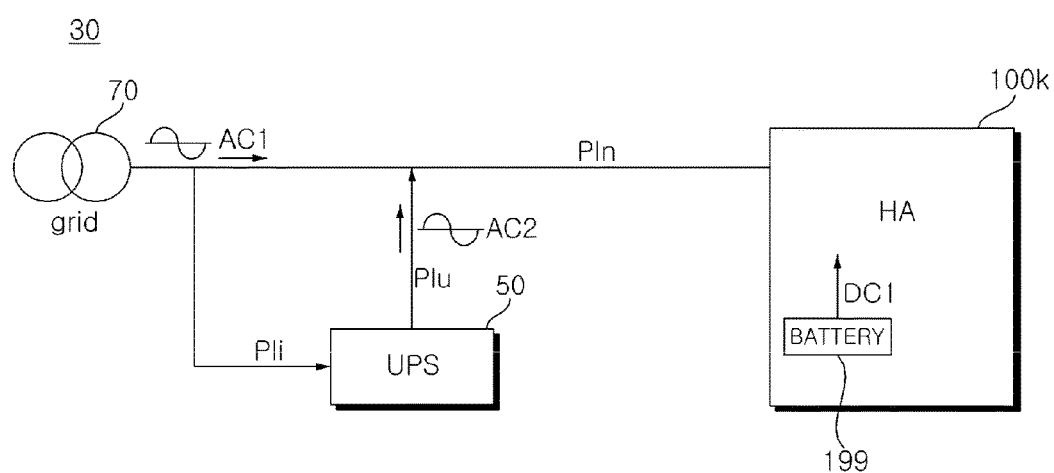
FIG. 10 is a view illustrating supply of electric power to a home appliance according to another embodiment of the present disclosure.

FIG. 10 illustrates supply of electric power to a home appliance according to another embodiment of the present disclosure. A power supply system 20 is illustrated, which may include a home appliance 100*k*, a grid 70, and a UPS 50. The UPS 50 differs from that of FIG. 1 in that the UPS 50 does not supply the DC power DC1, but supplies second AC power AC2, and the home appliance 100*k* further includes a battery 199. The following description will be given mainly in conjunction with such differences.

When no interruption of electric power occurs, the commercial AC power AC1 from the grid 70 is applied to the home appliance 100*k* via a first line Pln. Using the commercial AC power AC1, the home appliance 100*k* supplies the first electric power Le1 to the load 244 therein. The home appliance 100k may also store the DC power DC1 in the battery 199 using the commercial AC power AC1.

During interruption of electric power, the UPS 50 supplies the second AC power AC2 to the first power line Pln via a line PLu. The home appliance 100k may store the DC power DC1 to the battery 199 during interruption of electric power using the second AC power AC2.

The home appliance 100k may supply electric power based on the DC power DC1 stored in the battery 199 to the load 244 during interruption of electric power. In particular, when a power saving mode input is received, the third electric power Le3 may be supplied to the load 244. On the other hand, the second electric power Le2 may be supplied to the load 244 when no power saving mode input is received. The home appliance 100k of FIG. 10 may omit the DC power sensor 409 of FIG. 5.

Figure 11:
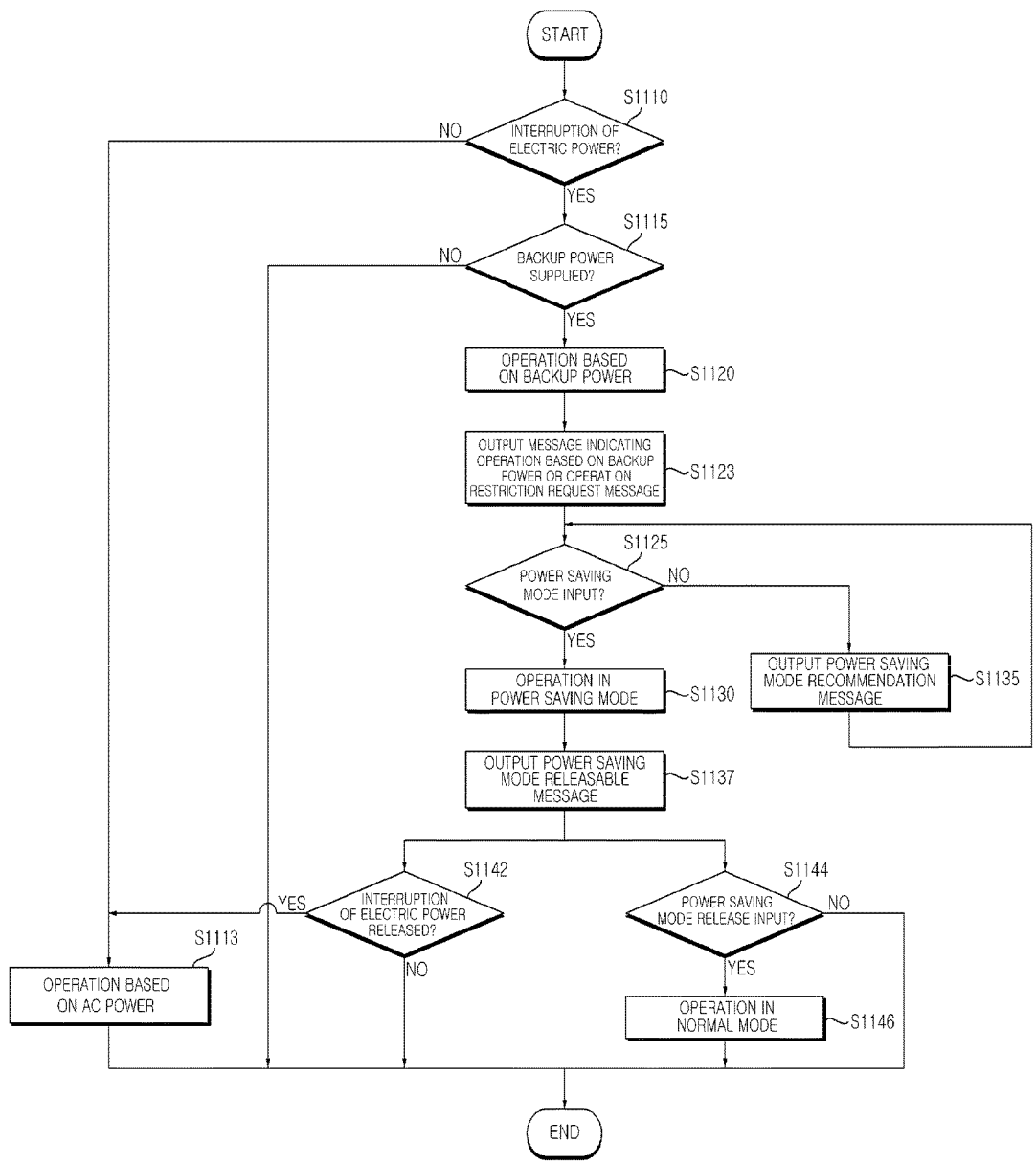
FIG. 11 is a flowchart illustrating an operating method of the home appliance according to another embodiment of the present disclosure.

FIG. 11 is a flowchart illustrating an operating method of the home appliance according to another embodiment of the present disclosure. FIGS. 12A to 12E are views explaining the operating method of FIG. 11. The controller 310 of the home appliance first determines whether or not interruption of electric power has occurred (S1110). The controller 310 may determine whether or not interruption of electric power has occurred, based on level of the AC power AC1 sensed by the AC power sensor 407 or level of the DC power DC1 sensed by the DC power sensor 409.

When the level of the AC power AC1 sensed by the AC power sensor 407 is equal to or lower than a predetermined first level, the controller 310 may determine that interruption of electric power has occurred. Alternatively, when the level of the DC power DC1 sensed by the DC power sensor 409 is equal to or lower than a predetermined second level, the controller 310 may determine that interruption of electric power has occurred.

When determined that interruption of electric power has not occurred, the controller 310 controls the home appliance 100 to operate normally (S1113). The controller 310 of the home appliance 100 controls the home appliance 100 to operate normally based on the commercial AC power AC1 supplied to the home appliance 100. The controller 310 executes a control operation to supply the first electric power Le1 to the load 244 based on the applied AC power AC1.

When it is determined that interruption of electric power has occurred, step S1115 is executed. The controller 310 of the home appliance 100 determines whether or not backup power is supplied (S1115). The backup power may be the above-described DC power. The following description will be given in conjunction with the case in which the backup power is the DC power.

For example, the controller 310 may not only determine that interruption of electric power has occurred, but may also determine that the DC power DC1 is supplied when the level of the DC power DC1 sensed by the DC power sensor 409 is equal to or higher than a predetermined second level. When the DC power DC1 is supplied, the controller 310 of the home appliance 100 controls the home appliance 100 to operate based on the supplied DC power DC1 (S1120).

The controller 310 of the home appliance 100 may perform a control operation to supply the second electric power Le2 based on the DC power DC1 to the load 244 in accordance with the normal operation mode. In this case, the second electric power Le2 in the normal operation mode may be lower than the first electric power Le1 before interruption of electric power.

When the home appliance 100 operates based on backup power, namely, the DC power, the controller 310 of the home appliance 100 performs a control operation to output a message indicating an operation based on the backup power or an operation restriction request message to the display 230 (S1123).

Figure 12A:
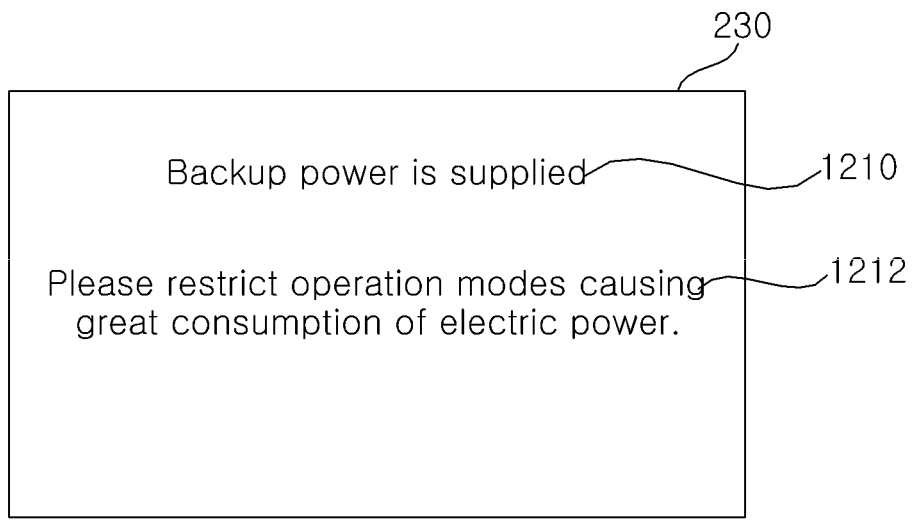
FIGS. 12A to 12E are views explaining the operating method of FIG. 11.
Figure 12B:
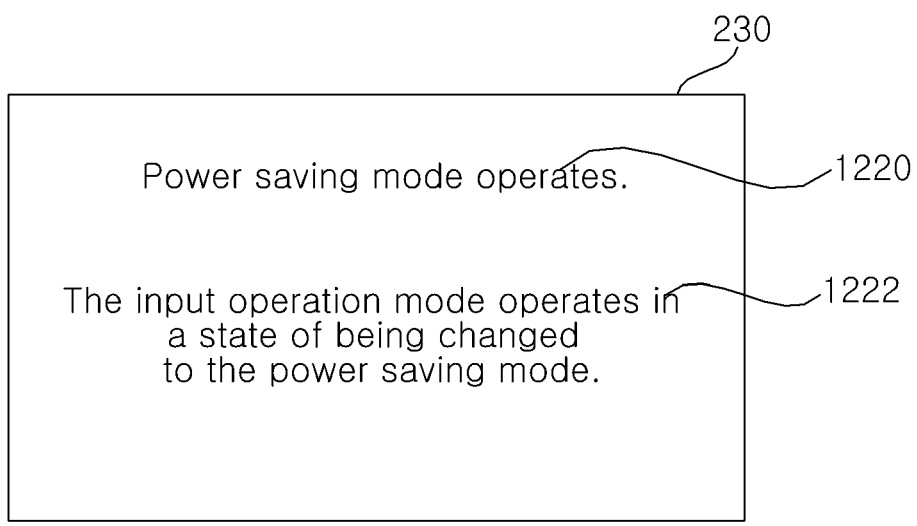

FIG. 12A illustrates simultaneous display of a message 1210 indicating an operation based on the backup power and an operation restriction request message 1212 on the display 230. Alternatively, the message 1210 and the message 1212 may be sequentially displayed.

The controller 310 of the home appliance 100 determines whether or not a power saving mode input has been received (S1125). When it is determined that a power saving mode input has been received, the controller 310 controls the home appliance 100 to operate in the power saving mode (S1130). When it is not determined that a power saving mode input has been received, the controller 310 may perform a control operation to output a power saving mode recommendation message while controlling the home appliance 100 to operate normally (S1135).

For example, when a power saving mode button 220a (FIG. 8) in the input unit 220 operates upon interruption of electric power, the controller 310 of the home appliance 100 controls the home appliance 100 to operate in the power saving mode. Examples of the power saving mode in various home appliances will be described.

In one example, when the home appliance 100 is a dehumidifier, in the power saving mode, the home appliance 100 may operate in a minimal dehumidification mode settable by the user or in a minimal dehumidification mode taking into consideration temperature and humidity of ambient air. In addition, an air cleaning function may be restricted.

In another example, when the home appliance 100 is the air conditioner 100c, the home appliance 100 may operate in a minimal cold capacity mode settable by the user and/or in a minimal cold capacity mode taking into consideration temperature and humidity of ambient air. In addition, a power cooling function and a strong blowing function may be restricted.

In another example, when the home appliance 100 is the washing machine 100b, the function of the heater to heat water when cold water is supplied may be restricted, respective times of washing courses may be reduced, and/or abrupt rotation variation of the motor in a forward or backward rotation direction may be reduced to reduce power consumption of the motor. In the case of a top load washing machine including an upwardly opened washing tub, rotation of a pulsator may be restricted under the condition that tub washing is executed.

In another example, when the home appliance 100 is a dryer, a message informing of requirement to clean a duct and a filter may be output in order to reduce power consumption. In addition, a drying function using hot air may be restricted and, in place thereof, a blowing function may be executed. Alternatively, after the drying function using hot air is executed for a predetermined time, a message informing of stoppage of the drying function may be output, and the drying function may be stopped in order to reduce execution time.

In another example, when the home appliance 100 is the cleaner 100e, a message informing of requirements to empty a dust box and to clean a filter may be output during operation of the home appliance 100 in order to reduce power consumption. In addition, a high power function such as a strong suction function may be restricted. Alternatively, after the high power function is executed for a predetermined time, a message informing of stoppage of the high power function may be output, and the high power function may be stopped, in order to reduce execution time.

In still another example, when the home appliance 100 is a water purifier, heating temperature for supply of hot water may be lowered, cooling temperature for supply of cold water may be raised, or functions such as fast heating and fast cooling may be restricted.

In accordance with the power saving mode executed during interruption of electric power, it may be possible to reduce power consumption of the home appliance and as such, consumption of the DC power supplied from the UPS 50 may be reduced. Accordingly, it may be possible to use the DC power for a longer period of time. When the UPS 50 is provided with a battery, the home appliance 100 may be stably driven for a lengthened period of time.

During interruption of electric power, the controller 310 may restrict operation of the driver or vary the operation mode in accordance with the level of the DC power DC1 sensed during interruption of electric power while operating in the power saving mode.

When it is determined at step S1125 that there is no power saving mode input for a predetermined time, the controller 310 may perform a control operation to output a power saving mode recommendation message while controlling the home appliance 100 to operate normally. The power saving mode recommendation message may be output through the display 230 or the audio output unit.

Figure 12C:
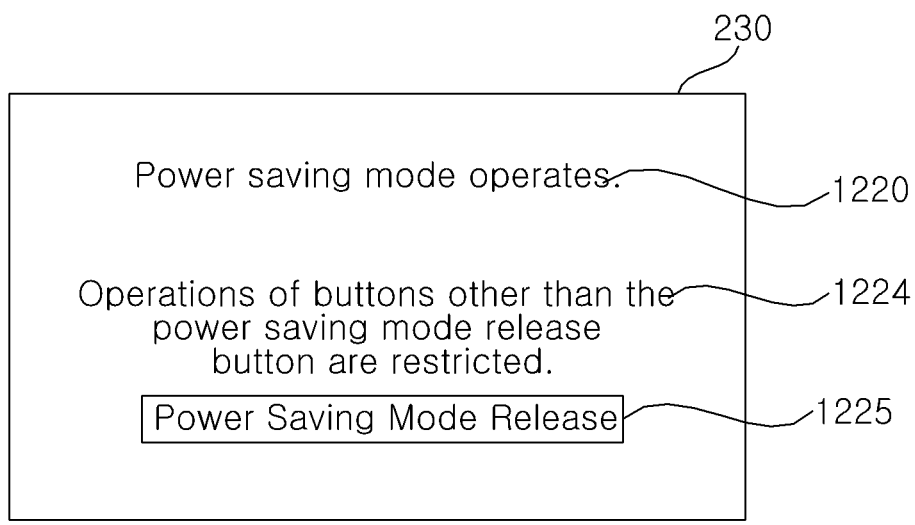
Figure 12D:
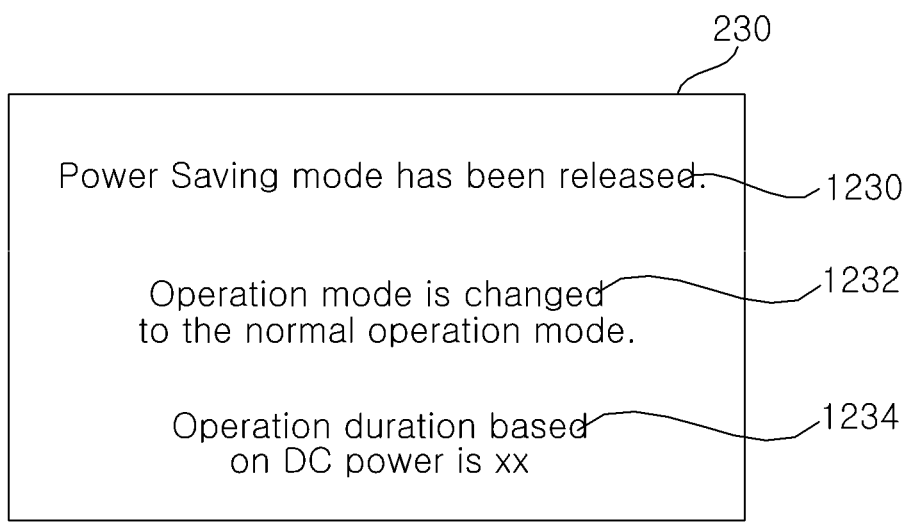
Figure 12E:
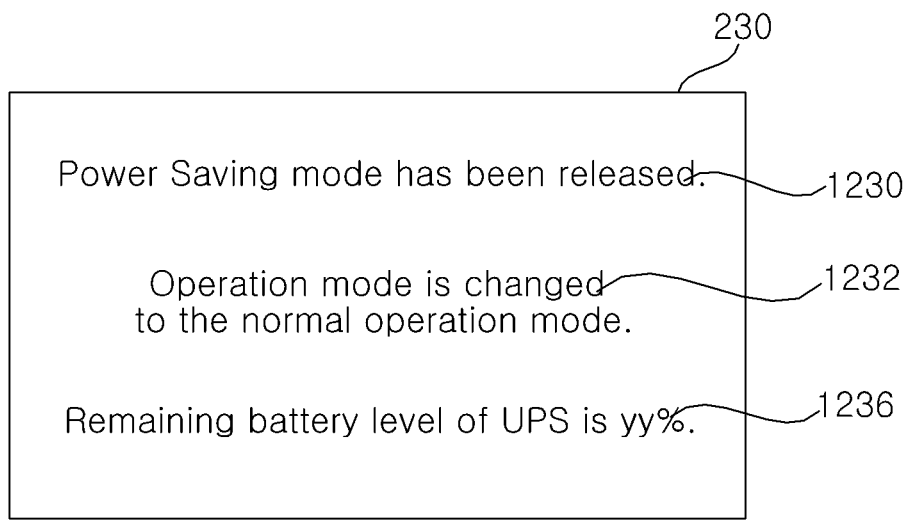

After the home appliance 100 enters the power saving mode at step S1130, the controller 310 may perform a control operation to output a power saving mode releasable message (S1137). FIG. 12C illustrates display of a message 1220 indicating a power saving mode operation and a message 1224 indicating restriction of operations of buttons other than the power saving mode release button.

When the display 230 is implemented using a touchscreen, it may be possible to further display a power saving mode release button 1225 on the display 230. In this case, the user may release the power saving mode by pressing the power saving mode release button 1225.

The controller 310 determines whether or not a power saving mode release input has been received (S1144). When it is determined that a power saving mode release input has been received, the controller 310 controls the home appliance 100 to operate in the normal operation mode (S1146). The controller 310 may control the driver to operate in the normal operation mode based on the DC power.

When the power saving mode is released, the controller 310 may perform a control operation to display a power saving mode release message 1230 and a normal operation mode message 1232. The controller 310 may also perform a control operation to display information 1234 as to an operation duration based on the backup power, namely, the DC power. Accordingly, it may be possible to enhance user convenience.

When the power saving mode is released in a state in which the DC power from the battery of the UPS 50 is supplied, the controller 310 may perform a control operation to display information 1236 as to a remaining level of the battery on the display 230. In this case, the home appliance 100 may periodically receive the remaining battery level information, and user convenience may be enhanced.

In addition to the remaining battery level information 1236, the power saving mode release message 1230 and normal operation mode message 1232 may be displayed. The information 1234 as to an operation duration based on the DC power may also be displayed.

The controller 310 may also determine whether or not interruption of electric power has been released (S1142). When it is determined that interruption of electric power has been released, the controller 310 performs a control operation to operate the home appliance 100 in the normal operation mode based on the AC power, as at step S1113. When the AC power sensor 407 senses inputting of the commercial AC power, the controller 310 may determine that interruption of electric power has been released.

Although FIGS. 12A to 12E illustrate display of various messages on the display, such messages may be output in the form of audio through the audio output unit.

The home appliance and operating method thereof according to the present disclosure can be realized as code, which can be written on a recording medium that can be read by a processor equipped in the home appliance and can be read by a processor. The recording medium that can be read by a processor includes various kinds of recording media, on which data that can be read by a processor is written, such as a read only memory (ROM), a random access memory (RAM), a CD-ROM, a magnetic tape, a floppy disk, an optical data storage, and a carrier wave type (e.g., transmission over the Internet). The recording medium that can be read by a processor can be distributed to computer systems connected to one another on a network, and code that can be read by a processor can be stored in the recording medium in a distributed manner and executed.

As apparent from the above description, the home appliance according to each of the above-described embodiments of the present disclosure may simply inform of an operation mode upon interruption of electric power in accordance with a configuration including a driver to drive a load, a power supply to convert AC power supplied from an outside of the home appliance, and to receive backup power during interruption of electric power, a display, and a controller to perform a control operation to operate the home appliance based on the backup power and to output a message informing of the operation based on the backup power or an operation restriction request message to the display, upon interruption of electric power.

A control operation is performed to output a power saving mode releasable message to the display during operation in the power saving mode in response to a power saving mode input upon interruption of electric power and, as such, user convenience may be enhanced.

Operations of buttons other than the power saving mode button or power saving mode release button are restricted during operation in the power saving mode and, as such, the operation in the power saving mode may be stably executed.

It may also be possible to restrict operation of the driver or to vary operation mode during operation in the power saving mode in accordance with the sensed level of the backup power and, as such, power consumption may be reduced.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:
an input unit including a plurality of buttons;
a driver to drive a load;
a power supply to convert AC power supplied from an outside of the home appliance, and to receive backup power during interruption of electric power;
a display; and
a controller to perform a control operation to operate the home appliance based on the backup power and to output a message informing of the operation based on the backup power or an operation restriction request message to the display upon interruption of electric power,
wherein the controller performs a control operation to operate the driver in a power saving mode based on a power saving mode input,
wherein a power saving mode button of the plurality of buttons is activated upon interruption of electric power, and
wherein when the power saving mode operates during interruption of electric power, only a power saving mode release button of the plurality of buttons is activated, and other buttons of the plurality of buttons are deactivated,
wherein the load includes an AC load including power to a motor and a DC load including power to the display,
wherein the power supply includes:
a first converter that converts AC power supplied from the outside into DC power; and
a second converter that receives the backup power from an external uninterruptible power supply (UPS) upon interruption of electric power, and converts a level of DC power in the backup power supplied from the external UPS,
wherein the driver includes an inverter that converts DC power from the first converter into 3-phase AC power and outputs the converted 3-phase AC power to the motor,
wherein DC power from the second converter is applied to the inverter and the DC load, and
wherein the inverter converts DC power from the second converter into 3-phase AC power and outputs the converted 3-phase AC power to the motor upon interruption of electric power.

2. The home appliance according to claim 1, wherein the controller performs a control operation to output a power saving mode releasable message to the display upon the interruption of electric power.

3. The home appliance according to claim 2, wherein:
the controller performs a control operation to operate the driver in a normal operation mode based on a power saving mode release input when the power saving mode release input is received; and the controller performs a control operation to operate the driver based on AC power supplied from the outside when the interruption of electric power is released.

4. The home appliance according to claim 2, wherein the controller restricts operation of the driver or varies an operation mode of the home appliance in accordance with a level of the backup power sensed in the power saving mode.

5. The home appliance according to claim 2, wherein the controller performs a control operation to output a power saving mode recommendation message when no power saving mode input is received upon the interruption of electric power.

6. The home appliance according to claim 1, further comprising:
an AC power sensor to sense the AC power supplied from the outside; and
a DC power sensor to sense the DC power supplied upon the interruption of electric power,
wherein the controller determines whether or not interruption of electric power has occurred based on the AC power sensed by the AC power sensor or the DC power sensed by the DC power sensor.

7. The home appliance according to claim 1, wherein:
the power supply receives the backup power from a battery of an external uninterruptible power supply upon the interruption of electric power; and
the controller performs a control operation to display information as to a remaining level of the battery on the display.

8. The home appliance according to claim 7, wherein:
the controller performs a control operation to display the remaining battery level information when the power saving mode is released; and
the controller performs a control operation to display a power saving mode release message and a normal operation mode message, in addition to the remaining battery level information, when the power saving mode is released.

9. The home appliance according to claim 1, wherein the controller performs a control operation to display information as to an operation duration based on the backup power when the power saving mode is released during the interruption of electric power.

10. The home appliance according to claim 1, further comprising:
a battery to store DC power based on the converted AC power,
wherein the power supply receives the DC power from the battery upon the interruption of electric power.

11. An operating method of a home appliance including a driver to drive a load and an input unit including a plurality of buttons, comprising:
operating the driver based on AC power supplied to the home appliance;
operating the driver based on backup power supplied to the home appliance or stored in the home appliance upon interruption of electric power; and
outputting a message informing of the operation based on the backup power or an operation restriction request message; and
operating the driver in a power saving mode based on a power saving mode input,
wherein a power saving mode button of the plurality of buttons is activated upon interruption of electric power, and
wherein when the power saving mode operates during interruption of electric power, only a power saving mode release button of the plurality of buttons is activated, and other buttons of the plurality of buttons are deactivated, wherein the home appliance further comprises:
  a power supply to convert AC power supplied from an outside of the home appliance, and to receive backup power during interruption of electric power; and
  a display, wherein the load includes an AC load including power to a motor and a DC load including power to the display, wherein the power supply includes:
  a first converter that converts AC power supplied from the outside into DC power; and
  a second converter that receives the backup power from an external uninterruptible power supply (UPS) upon interruption of electric power, and converts a level of DC power in the backup power supplied from the external UPS, wherein the driver includes an inverter that converts DC power from the first converter into 3-phase AC power and outputs die converted 3-phase AC power to the motor, wherein DC power from the second converter is applied to the inverter and the DC load, and wherein die inverter converts DC power from the second converter into 3-phase AC power and outputs the converted 3-phase AC power to the motor upon interruption of electric power.

12. The operating method according to claim 11, further comprising:
  outputting a power saving mode releasable message upon the power saving mode operation.

13. The operating method according to claim 12, further comprising:
  operating the driver in a normal operation mode based on a power saving mode release input, when the power saving mode release input is received; and
  operating the driver based on AC power supplied from an outside of the home appliance when the interruption of electric power is released.

14. The operating method according to claim 12, further comprising:
  outputting a power saving mode recommendation message when no power saving mode input is received upon the interruption of electric power.

15. The operating method according to claim 12, wherein the operating the driver in a power saving mode comprises restricting operation of the driver or varying an operation mode of the home appliance in accordance with a level of the backup power.

16. The operating method according to claim 11, further comprising:
  receiving the backup power from a battery of an external uninterruptible power supply upon the interruption of electric power; and
  displaying information as to a remaining level of the battery on a display.

17. A home appliance comprising:
  an input unit including a plurality of buttons;
  a driver to drive at least one load of the home appliance, the at least one load requiring one of AC power and DC power for operation;
  a power supply configured to receive one of external AC power, back-up AC power and back-up DC power and to output at least one of AC power or DC power to the at least one load;
  a display configured to display an operation mode of the home appliance, the operation mode being one of normal operation when externally provided AC power is receive, normal operation when one of back-up AC power and back-up DC power is received during a power interruption, and a power save mode when one of back-up AC power and back-up DC power is received during the power interruption; and
  a controller to control the power supply, wherein the power supply provides a first power level when there is no power interruption, a second power level when there is power interruption and a third power level when there is power interruption and the power save mode is selected, wherein the second power level is less than the first power level, wherein the controller performs a control operation to operate the driver in a power saving mode based on a power saving mode input, wherein a power saving mode button of the plurality of buttons is activated upon interruption of electric power, and wherein when the power saving mode operates during interruption of electric power, only a power saving mode release button of the plurality of buttons is activated, and other buttons of the plurality of buttons are deactivated, wherein the load includes an AC load including power to a motor and a DC load including power to the display, wherein the power supply includes:
  a first converter that converts AC power supplied from the outside into DC power; and
  a second converter that receives the backup power from an external uninterruptible power supply (UPS) upon interruption of electric power, and converts a level of DC power in the backup power supplied from the external UPS, wherein the driver includes an inverter that converts DC power from the first converter into 3-phase AC power and outputs the converted 3-phase AC power to the motor, wherein DC power from the second converter is applied to the inverter and the DC load, and wherein the inverter converts DC power from the second converter into 3-phase AC power and outputs the converted 3-phase AC power to the motor upon interruption of electric power.

18. The home appliance of claim 17, wherein the power save mode is automatically selected when the second power level falls below a reference power level.

* * * * *